Figure 1:
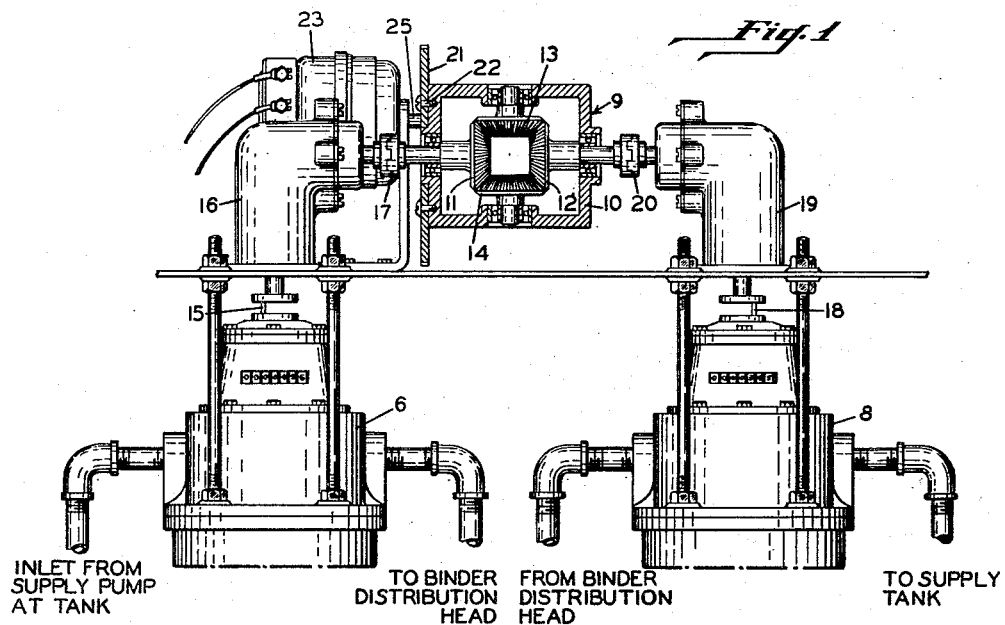

Oct. 19, 1954     L. H. LOCKWOOD     2,692,164
METHOD AND APPARATUS FOR CONTROLLING
DIFFERENTIAL FLOW OF MATERIALS
Filed April 23, 1951

INLET FROM
SUPPLY PUMP
AT TANK     TO BINDER
DISTRIBUTION
HEAD    FROM BINDER
DISTRIBUTION
HEAD     TO SUPPLY
TANK

INVENTOR
LOUIS H. LOCKWOOD

*Walter F. Kaufman*

ATTORNEY

Patented Oct. 19, 1954

2,692,164

UNITED STATES PATENT OFFICE 2,692,164

METHOD AND APPARATUS FOR CONTROLLING DIFFERENTIAL FLOW OF MATERIALS

Louis H. Lockwood, Rohrerstown, Pa., assignor to Armstrong Cork Company, Lancaster, Pa., a corporation of Pennsylvania Application April 23, 1951, Serial No. 222,443

5 Claims. (Cl. 299—58)

This invention relates to the control of the differential flow of materials, such as the flow of liquid through a distribution system in which a portion of the liquid delivered to a distribution head is discharged therefrom and another portion is recirculated.

The invention is useful in the cork composition industry where, in the continuous mixing of cork granules with a liquid binder, there is present the problem of controlling the amount of liquid binder applied to a continuously measured volume of cork delivered at the binder-applying zone. A continuous mixing system for applying binder to cork granules is disclosed in the copending application of Washington H. Phillips, Serial No. 196,135, filed November 17, 1950, and entitled "Method and Apparatus for Making Cork Compositions and the Like," now Patent 2,674,545. A plurality of thin streams of the liquid binder are directed onto the cork granules moving through a binder-applying zone, the streams emanating from orifices in a distribution tube disposed in a horizontal position above the converging path of two downwardly falling curtains of cork granules. The binder is customarily a mixture of glue, glycerine, and water which is heated to render it fluid, and it is necessary to circulate several times as much binder as is delivered onto the cork granules in order to maintain the desired temperature level in the binder and to avoid clogging of the orifices with congealed binder. With a recirculating system, and particularly with a heat-sensitive binder, it is not possible to accurately meter the volume of liquid applied to the cork granules in accordance with the volume of liquid delivered to the distribution tube or the volume received by the discharge system for recirculation. It is not feasible to meter the binder flowing through the individual distribution orifices.

The quantity of binder applied to a given volume of cork granules will vary with changes in the binder employed, the size of the cork granules used, the final density to which the product will be compressed, the intended use for the product, and other variable factors. It is important, therefore, to provide a system by which the rate of delivery of binder through the distribution tube onto the cork granules can be accurately determined and the flow can be readily altered as required, either manually or by automatic control.

In a continuous process of binder application, it is essential that the rate of delivery of binder through the discharge orifices be very accurately indicated and, where automatic operation is effected, accurately controlled. Since the quantity of binder distributed through the discharge orifices is the differential of the flow through the inlet and the outlet, it is essential that devices such as meters at each, the inlet and the outlet of the distribution tube, measure exactly alike.

An object of the present invention is to provide an accurate measure of the rate of differential flow of liquid materials.

Another object of the invention is to provide a differential liquid flow system which may be readily adjusted and its accuracy conveniently checked.

A further object of the invention is to provide a device for controlling the flow of a liquid through a plurality of discharge orifices in accordance with an electrical voltage generated upon differential flow through an inlet and an outlet conduit between which said discharge orifices are disposed.

Other objects of the invention will become apparent from consideration of the following description of a preferred embodiment of the invention which is illustrated in the attached drawing, in which:

Figure 1 is a side elevation, partially in section, illustrating in a generally diagrammatic manner a differential flow responsive device for use with a binder distribution system of the type disclosed in the copending application of Washington H. Phillips and George E. Gard, Serial No. 196,136, filed November 17, 1950, now Patent No. 2,657,094, and entitled "Recirculation System"; and Figure 2 is a schematic view of the apparatus of Figure 1 in a binder recirculation system.

Figure 2:
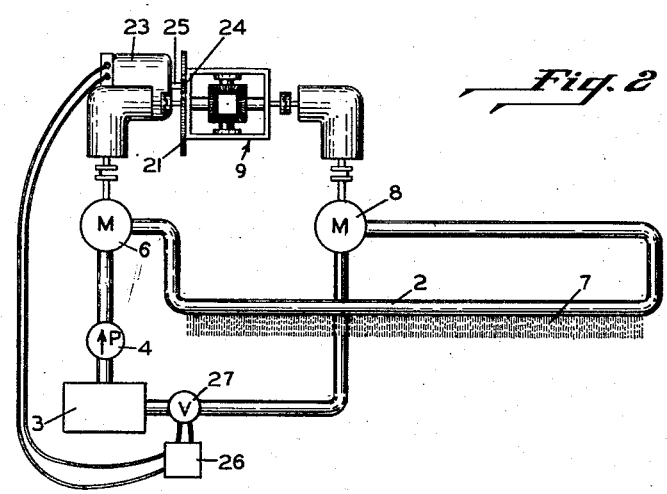

There is shown in Figure 2 a fluid distribution system including a distribution tube 2 such as disclosed in Patent 2,657,094 referred to above. The fluid may be in the nature of a mixture of glue, glycerine, and water supplied in heated condition from a tank 3 by a pump 4 and through a volumetric meter 6. The distribution tube 2 conveys the fluid in a volume greatly in excess of that required for distribution through the orifices 7 thereof, the excess being required to maintain the liquid as a moving body at a substantially uniform elevated temperature. The excess liquid is returned to the tank 3 through a volumetric meter 8. With this arrangement, the difference between the volume of liquid flowing through the inlet meter 6 and the outlet meter 8 is the volume of liquid delivered through the orifices 7 of the distribution tube 2.

This differential flow of liquid through the meters may be utilized to indicate the rate of flow of liquid through the distribution orifices and may be also arranged to provide an automatic control on the rate of flow of liquid through the distribution orifices.

In the embodiment illustrated in the drawing, differential flow of liquid in the system is effective for actuating an electrical voltage generator, the voltage from which may be translated into a suitable indicating and/or flow control arrangement.

There is provided a differential 9 which comprises a yoke 10, driven gears 11 and 12, and idler gears 13 and 14. The gear 11 is driven by the input meter 6 through a pin connection 15, an angle drive 16, and a flexible coupling 17. Gear 12 is driven by the output meter 8 through a pin connection 18, an angle drive 19, and a flexible coupling 20. A gear 21 is secured to the yoke 10 by screws 22.

When the rate of flow of liquid through output meter 8 is equal to the rate of flow of liquid through input meter 6, gears 11 and 12 will be rotated at the same speed and there will be no rotation imparted to the yoke 10.

In the embodiment shown in Figure 2, the generator 23 is connected to an amplifier and voltage responsive control device indicated at 26, such as a Leeds and Northrup "Speedomax" flow recorder with its associated control unit. This device receives the voltage from the tachometer generator 23, amplifies it, and utilizes it to control the opening and closing of an electrically driven control valve 27 which is disposed in the return line from meter 8 to the tank 3. The control device is so arranged that upon the delivery of a predetermined voltage thereto by the generator 23, valve 27 will be positioned to apply a predetermined back pressure upon the distribution tube 2 to effect delivery of binder through its distribution orifices 7 at a predetermined rate. When the rate of delivery through the distribution orifices falls, the speed of rotation of the yoke 10, which is directly related to the rate of delivery of binder through the orifices 7, decreases, the voltage supplied to the controller 26 falls, and the valve 27 is further closed, building up the back pressure in the system, and the rate of binder delivery is increased. As the rate of binder delivery increases, the voltage supplied by the generator 23 to the controller 26 increases and the valve 27 moves toward a further open position, reducing the back pressure and decreasing the flow through the distribution orifices. Any device which is effective for controlling the valve 27 or its equivalent in accordance with changes in voltage supplied by generator 23 may be substituted for the specific control mentioned. For instance, a General Electric "Telemeter" device may be employed. This is a contact-making voltmeter which may be connected to the voltage generator 23. The contact arm of the "Telemeter" will move in accordance with the voltage applied thereto by the voltage generator 23. As the current increases, the contact arm will move from its null position to a position in engagement with a contact closing circuit for electrical control valve 27, to open the valve. As the voltage decreases, the contact arm will move in the opposite direction, to its null position; and if the voltage continues to decrease, it will move past its null position into engagement with a second contact which will be effective for energizing the control for the valve 27, to close the same and thereby increase the back pressure and effect the delivery of more binder through the discharge orifices 7.

Where the process is to be carried out by hand, the generator 23 may actuate an indicating device which may be calibrated in rate of binder flow by volume or by weight, and a hand valve 27 may be provided, manually controlled.

In setting up the machine for operation, input meter 6 may be checked for accuracy by measuring a quantity of binder passing therethrough and comparing the measured volume with the meter reading. Any adjustment necessary to meter 6 may be made to obtain the desired accuracy, and then meter 8 will be adjusted to match meter 6. This may be conveniently accomplished by adjusting meter 8 until there is no motion of yoke 10 when binder is flowing at the same rate through both the inlet and discharge portions of the system. This may be accomplished by positioning the closing sleeve of the Phillips and Gard application referred to above over the discharge orifices 7 so that all binder supplied through meter 6 passes through meter 8. Having adjusted the meters in this manner, the control 26 will be set to maintain the valve 27 in a predetermined adjusted position, opening or closing as the speed of rotation of the generator 23 changes in accordance with the rate of flow of binder through the discharge orifices 7. To insure accurate control within narrow limits, it may be desirable to synchronize the meters 6 and 8 periodically, say once each eight hours of operation, where there is any noted tendency for them to "wander" from an initial synchronized setting. The accuracy of the meters need not be checked so frequently so long as they are maintained in synchronism, for the control is responsive to the differential flow, and the actual flow through the meters will generally be many times the flow through the discharge orifices.

I claim:

1. In a device responsive to the differential flow of liquid through a pair of metering devices, the combination of a distribution tube having discharge orifices therein, a differential gear train and yoke, a volumetric meter responsive to the input of liquid to said distribution tube driving one of the driven gears of the differential gear train, a second volumetric meter responsive to the output of liquid from said distribution tube for recirculation driving a second driven gear of the differential gear train, differences in speed of rotation of said driven gears rotating said diffential, an electrical voltage generator driven by said differential, and means responsive to the voltage of said generator for controlling the rate of delivery of liquid through said discharge orifices.

2. In a device responsive to the differential flow of liquid through a distribution tube, the combination of a distribution tube having discharge orifices therein, a liquid supply tank, a pump for delivering liquid under pressure from said supply tank to said distribution tube and for circulating liquid from said distribution tube to said supply tank, a differential gear train, a volumetric meter responsive to the input of liquid to said distribution tube driving one of the driven gears of the differential gear train, a second volumetric meter responsive to the output of liquid from said distribution tube for recirculation driving a second driven gear of the differential gear train, differences in speed of rotation of said driven gears rotating said differential, an electrical voltage generator driven by said differential, and means for controlling the rate of delivery of liquid through said discharge orifices comprising a valve controlling the circulation of liquid from said distribution tube to said supply tank and means responsive to the voltage of said generator for actuating said valve.

3. In a method of controlling the differential flow of liquid, the steps comprising delivering liquid under pressure to a distribution tube having discharge orifices therein, recirculating a portion of the liquid delivered to the distribution tube, generating an electrical voltage in accordance with the difference between the input to the distribution tube and the output therefrom for recirculation, and controlling the volume of liquid delivered through said discharge orifices in accordance with the generated voltage.

4. In a method of controlling the differential flow of liquid, the steps comprising delivering liquid under pressure to a distribution tube having discharge orifices therein, recirculating a portion of the liquid delivered to the distribution tube, generating an electrical voltage in accordance with the difference between the input to the distribution tube and the output therefrom for recirculation, and establishing a back pressure on the distribution tube in accordance with the generated voltage to control the volume of liquid delivered through said discharge orifices.

5. In a device responsive to the differential flow of liquid through a distribution tube, the combination of a circulatory system including a distribution tube having discharge orifices therein, a liquid supply tank, a pump for delivering liquid under pressure from said supply tank to said distribution tube and for circulating liquid from said distribution tube to said supply tank, a volumetric meter responsive to the input of liquid to said distribution tube, a second volumetric meter responsive to the output of liquid from said distribution tube for recirculation, a differential driven by said meters and responsive to differences in the volume of said input and output of liquid to and from said distribution tube, and a valve in said circulatory system actuated by energy from said differential for varying the pressure of liquid in said circulatory system and controlling the rate of delivery of liquid through said discharge orifices.

References Cited in the file of this patent

UNITED STATES PATENTS

| Number | Name | Date |
|---|---|---|
| 1,961,350 | Grunsky | June 5, 1934 |
| 2,022,481 | Schellenger | Nov. 26, 1935 |
| 2,290,408 | Crites | July 21, 1942 |
| 2,604,149 | Wynne | July 25, 1952 |